United States Patent
Kober et al.

(10) Patent No.: US 10,458,874 B2
(45) Date of Patent: Oct. 29, 2019

(54) PRESSURE DIFFERENCE SENSOR FOR PROVIDING A PRESSURE MEASUREMENT SIGNAL

(71) Applicant: Endress + Hauser GmbH + Co. KG, Maulburg (DE)

(72) Inventors: Timo Kober, Potsdam (DE); Benjamin Lemke, Berlin (DE); Rafael Teipen, Berlin (DE); Benjamin Mack, Lorrach (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 111 days.

(21) Appl. No.: 15/652,341

(22) Filed: Jul. 18, 2017

(65) Prior Publication Data
US 2018/0031434 A1 Feb. 1, 2018

(30) Foreign Application Priority Data
Jul. 29, 2016 (DE) .......................... 10 2016 114 033

(51) Int. Cl.
*G01L 19/04* (2006.01)
*G01L 9/00* (2006.01)
(Continued)

(52) U.S. Cl.
CPC ............ *G01L 19/04* (2013.01); *G01L 9/0072* (2013.01); *G01L 9/0095* (2013.01);
(Continued)

(58) Field of Classification Search
CPC ... G01L 19/147; G01L 9/0042; G01L 9/0072; G01L 13/025; G01L 19/04; G01L 9/0054;
(Continued)

(56) References Cited

U.S. PATENT DOCUMENTS

| 5,955,675 A | 9/1999 | Peterson |
|---|---|---|
| 9,054,222 B2 | 6/2015 | Tham |
| (Continued) | | |

FOREIGN PATENT DOCUMENTS

| CN | 87106322 A | 7/1988 |
|---|---|---|
| CN | 1198813 A | 11/1998 |
| (Continued) | | |

OTHER PUBLICATIONS

German Search Report, German Patent Office, Munich, DE, dated Oct. 31, 2016.
(Continued)

*Primary Examiner* — Andre J Allen
(74) *Attorney, Agent, or Firm* — Bacon & Thomas, PLLC

(57) ABSTRACT

A pressure difference sensor for providing a pressure measurement signal, comprising: a pressure difference measuring cell, which is suppliable with first and second pressures and which outputs the pressure measurement signal; first and second ceramic stiffening elements, each of which is joined with the pressure difference measuring cell and has a duct, via which the first, respectively the second, pressure is suppliable to the pressure difference measuring cell; a platform with first and second pressure input openings, each of which extends from a first surface to a second surface of the platform, wherein the pressure input openings are sealed on the first surface, each with its own isolating diaphragm, and first and second pressures tubes, which are arranged between the stiffening elements and the platform, and wherein each of the first pressure tube and the second pressure tube has at least one bend in a region between the platform and a first, respectively second, connecting area of the corresponding pressure tube.

6 Claims, 5 Drawing Sheets

(51) Int. Cl.
   *G01L 13/06* (2006.01)
   *G01L 13/02* (2006.01)
   *G01L 19/00* (2006.01)
   *G01L 19/06* (2006.01)

(52) U.S. Cl.
   CPC ............ *G01L 13/025* (2013.01); *G01L 13/06* (2013.01); *G01L 19/0007* (2013.01); *G01L 19/0681* (2013.01); *G01L 19/0618* (2013.01)

(58) Field of Classification Search
   CPC ............... G01L 9/0075; G01L 19/0038; G01L 19/0084; G01L 19/14; G01L 19/0069; G01L 19/0618; G01L 19/0645; G01L 9/0055; G01L 9/0073; G01L 19/0092; G01L 19/143; G01L 9/0051; G01L 9/0052; G01L 11/025; G01L 19/0007; G01L 19/0046; G01L 19/06; G01L 19/0627; G01L 19/0681; G01L 9/00; G01L 9/0041; G01L 9/0044; G01L 11/04; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16
   USPC ................................................... 73/700–756
   See application file for complete search history.

(56) References Cited

U.S. PATENT DOCUMENTS

| | | | |
|---|---|---|---|
| 2007/0272027 | A1 | 11/2007 | Hedtke |
| 2012/0085180 | A1 | 4/2012 | Carton |
| 2017/0227412 | A1 | 8/2017 | Becher |

FOREIGN PATENT DOCUMENTS

| | | | |
|---|---|---|---|
| CN | 101606049 | A | 12/2009 |
| CN | 103292947 | A | 9/2013 |
| CN | 103477199 | A | 12/2013 |
| CN | 104870961 | A | 8/2015 |
| DE | 19516326 | A1 | 11/1996 |
| DE | 69732688 | T2 | 7/2005 |
| DE | 102011006517 | A1 | 10/2012 |
| DE | 102014110615 | A1 | 1/2016 |
| FR | 2544071 | | 10/1984 |

OTHER PUBLICATIONS

European Search Report, European Patent Office, Munich, DE, dated Dec. 22, 2017.
Chinese Office Action issued in corresponding Chinese Application No. 201710590095.0, dated May 5, 2019.

PRESSURE DIFFERENCE SENSOR FOR PROVIDING A PRESSURE MEASUREMENT SIGNAL

TECHNICAL FIELD

The invention relates to a pressure difference sensor for providing a pressure measurement signal.

BACKGROUND DISCUSSION

Pressure difference sensors for use in industrial measurements technology are sufficiently known from the state of the art. Such are usually composed of a micromechanically manufactured, pressure difference measuring cell based on a semiconductor material. The pressure difference measuring cell is arranged between two stiffening elements. For obtaining a pressure measurement signal, the pressure difference measuring cell is fed a first pressure and a second pressure. To this end, each stiffening element has a duct with a 90° change of direction in it. On one end of a stiffening element, its duct is in communication with the pressure difference measuring cell. The other end communicates with a capillary tube. The capillaries, in turn, connect the stiffening element with a platform, which serves for connecting the pressure difference measuring cell to a process. For this, the platform includes two isolating diaphragms, each of which isolates a hydraulic path formed from the platform via the capillaries and the stiffening elements to the pressure difference measuring cell from the medium to be measured. Via each hydraulic path, the pressure applied against its isolating diaphragm is led to the pressure difference measuring cell, in order to generate the pressure measurement signal.

In the case of the pressure difference sensors known from the state of the art, the capillaries are usually embodied as straight tubes extending between the stiffening elements and the platform. Materials used for pressure difference sensors known from the state of the art include, for the platform, a stainless steel (VA steel), for the capillaries, a Kovar alloy, and, for the stiffening elements, a ceramic.

This matter of construction has the disadvantage that, in the case of temperature changes, the platform expands significantly more than the composite of stiffening element and pressure difference measuring cell, since the thermal expansion coefficient of the platform material is significantly greater than that of the material of the pressure difference measuring cell, and the material of the stiffening element. The expansion differences lead, in turn, to an occurrence of a bending loading of the pressure difference measuring cell. The bending loading can lead to a corruption of the pressure measurement signal and, thus, to a limiting of accuracy and/or long term stability. Moreover, the bending loading can, in the worst case, lead to a destruction of the pressure difference measuring cell or another part of the pressure difference sensor.

SUMMARY OF THE INVENTION

It is, thus, an object of the invention to provide a pressure difference measuring cell, which has an increased mechanical stability in the presence of temperature changes.

The object is achieved according to the invention by a pressure difference sensor which provides a pressure measurement signal includes:

a pressure difference measuring cell, which is suppliable with first and second pressures and which has a transducer, which outputs the pressure measurement signal as a function of a difference between the first and second pressures;

a first ceramic stiffening element (preferably a first stiffening element of aluminum nitride), which is joined with the pressure difference measuring cell and which has a first duct, via which the first pressure is suppliable to the pressure difference measuring cell;

a second ceramic stiffening element (preferably a second stiffening element of aluminum nitride), which is joined with the pressure difference measuring cell and which has a second duct, via which the second pressure is suppliable to the pressure difference measuring cell;

a platform with first and second pressure input openings, each of which extends from a first surface to a second surface of the platform, wherein the pressure input openings are sealed on the first surface, each with its own isolating diaphragm, a first pressure tube, which with a first end communicates with the first pressure input opening and which is pressure tightly connected with the platform, wherein the first pressure tube with a second end is pressure tightly connected with the first stiffening element at a first connecting area, a second pressure tube, which with a first end communicates with the second pressure input opening and which is pressure tightly connected with the platform, wherein the second pressure tube with a second end is pressure tightly connected with the second stiffening element at a second connecting area, wherein each of the first pressure tube and the second pressure tube has at least one bend in a region between the second surface of the platform and the first, respectively second, connecting area of the corresponding pressure tube.

According to the invention, the thermally related bending loading, or thermomechanical reaction, is prevented by a novel geometry of the capillaries, or pressure tubes, compared to the state of the art. The new geometry of the invention provides that the capillaries, or pressure tubes, are no longer straight between the stiffening elements and the platform, but, instead, have the mentioned bend, i.e. are bent, in such region.

An advantageous further development of the invention provides that the at least one bend is embodied in such a manner that a thermomechanical reaction of the platform on a composite of stiffening elements and pressure difference measuring cell is minimized at thermal equilibrium.

Another advantageous further development of the invention provides that the at least one bend of a pressure tube is embodied in such a manner that the first and second pressure tubes are directed toward one another, preferably cross over one another, and essentially the following holds:

$$\left| \frac{d \cdot \alpha_P + c \cdot \alpha_{SE} + \frac{a}{2} \cdot \alpha_{DC} - \left(c + d + \frac{a}{2}\right) \cdot \alpha_{PT}}{d \cdot \alpha_P + c \cdot \alpha_{SE} + \frac{a}{2} \cdot \alpha_{DC} + \left(c + d + \frac{a}{2}\right) \cdot \alpha_{PT}} \right| \leq \beta$$

wherein the following definitions hold:
a: the thickness of the pressure difference measuring cell in the direction of a first axis, which is defined by a first midpoint of the first connecting area and a second midpoint of the second connecting area;
c: separation in the direction of the first axis between a second axis, which represents a symmetry axis of the pressure difference sensor, and the first midpoint;

d: separation in the direction of the first axis between the second axis and a midpoint of the first end of the pressure tube;
$\alpha_{DC}$: thermal expansion coefficient of the pressure difference measuring cell;
$\alpha_{SE}$: thermal expansion coefficient of the stiffening elements;
$\alpha_{PT}$: thermal expansion coefficient of the pressure tubes;
$\alpha_P$: thermal expansion coefficient of the platform, and wherein
$\beta \leq 0.1$, preferably $\leq 0.05$, especially preferably $\leq 0.02$.

An alternative further development of the invention provides that the at least one bend of a pressure tube is embodied in such a manner that the first and second pressure tubes are directed away from one another and essentially the following holds:

$$\left| \frac{\left(d - c - \frac{a}{2}\right) \cdot \alpha_{PT} + c \cdot \alpha_{SE} + \frac{a}{2} \cdot \alpha_{DC} - d \cdot \alpha_P}{\left(d - c - \frac{a}{2}\right) \cdot \alpha_{PT} + c \cdot \alpha_{SE} + \frac{a}{2} \cdot \alpha_{DC} + d \cdot \alpha_P} \right| \leq \beta$$

wherein the following definitions hold:
a: thickness of the pressure difference measuring cell in the direction of a first axis, which is defined by a first midpoint of the first connecting area and a second midpoint of the second connecting area;
c: separation in the direction of the first axis between a second axis, which represents a symmetry axis of the pressure difference sensor, and the first midpoint;
d: separation in the direction of the first axis between the second axis and a midpoint of the first end of the pressure tube;
$\alpha_{DC}$: thermal expansion coefficient of the pressure difference measuring cell;
$\alpha_{SE}$: thermal expansion coefficient of the stiffening elements;
$\alpha_{PT}$: thermal expansion coefficient of the pressure tubes;
$\alpha_P$: thermal expansion coefficient of the platform, and wherein:
$\beta \leq 0.1$, preferably $\leq 0.05$, especially preferably $\leq 0.02$.

Another advantageous further development of the invention provides that the first midpoint of the first connecting area and the second midpoint of the second connecting area are, in each case, offset by a predetermined value $c_Z$ from a plane, which is orthogonal to a joint plane, on which the particular stiffening element is joined with the pressure difference measuring cell, and offset rotationally symmetrically to the second axis. Especially, the further development can provide that essentially the following holds:

$$\frac{|c_Z| \cdot \alpha_{SE} + |d_Z| \cdot \alpha_P - (|c_Z| + |d_Z|) \cdot \alpha_{PT}}{|c_Z| \cdot \alpha_{SE} + |d_Z| \cdot \alpha_P + (|c_Z| + |d_Z|) \cdot \alpha_{PT}} \leq \beta$$

wherein the following definitions hold:
$c_z$: separation in the direction of a third axis (48) between the plane (49) and the first, respectively the second, midpoint (21a, 23a) of the first, respectively second, connecting surface (21, 23), wherein the third axis is orthogonal to the first and second axes;
$d_z$: separation between the plane (49) and the midpoint of the respective pressure tube at the first end (20aa, 22aa);
$\alpha_{SE}$: thermal expansion coefficient of the stiffening elements;
$\alpha_{PT}$: thermal expansion coefficient of the pressure tubes;
$\alpha_P$: thermal expansion coefficient of the platform, and wherein:
$\beta \leq 0.1$, preferably $\leq 0.05$, especially preferably $\leq 0.02$.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
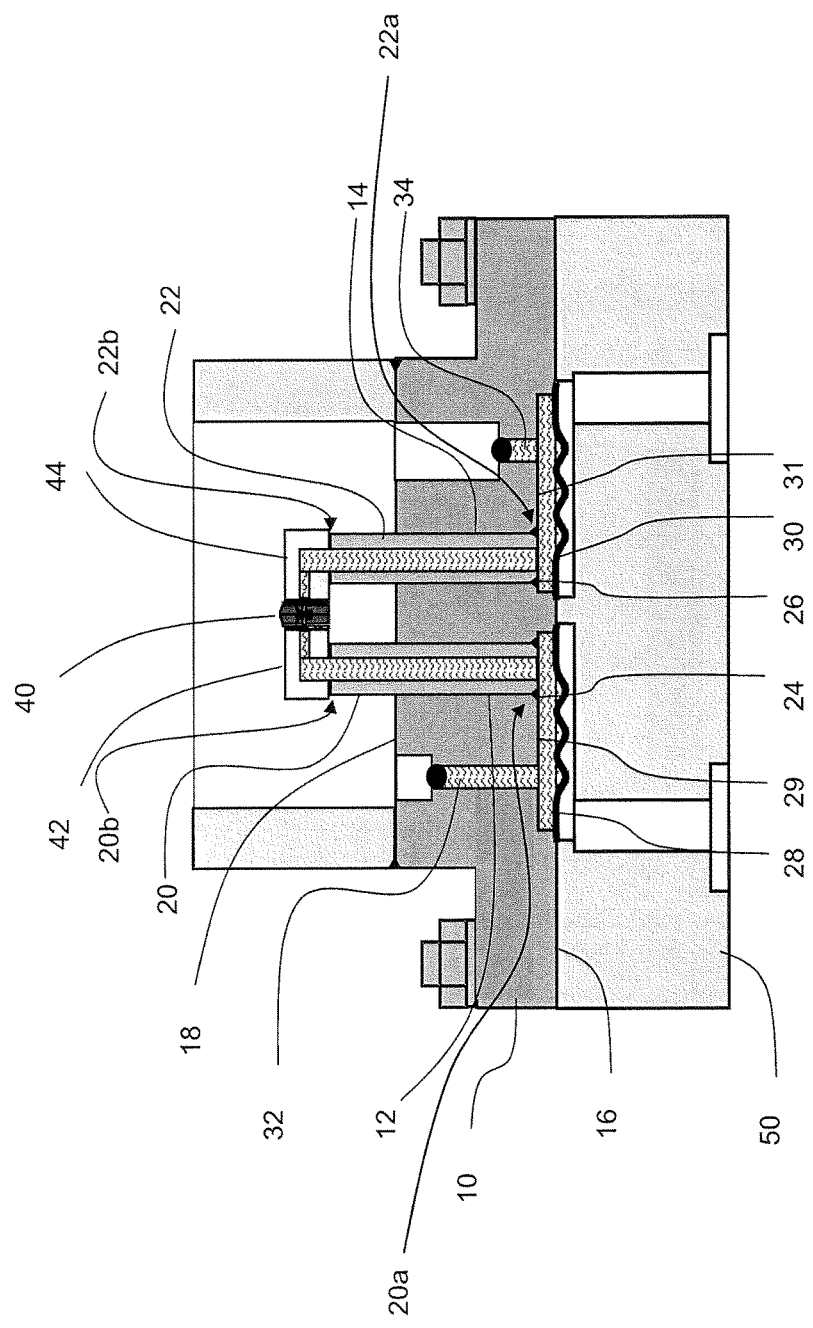
FIG. 1 is a schematic longitudinal section through a pressure difference sensor known from the state of the art.

The known pressure difference sensor shown in FIG. 1 includes a platform 10, which typically comprises a VA steel, such as a 304 or 316 stainless steel. Extending from platform 10 as straight bores from a first surface 16 of the platform 10 to a second surface 18 of the platform 10 are first and second pressures input openings 12, 14. In the example illustrated in FIG. 1, the pressure input openings 12, 14 extend from a process connection surface 16 to a rear side 18 of the platform facing away from the process connection surface 16. Inserted in the bores of the input openings 12, 14 are first and second, straight, pressure tubes in the form of capillary tubes 20, 22, which extend out from the rear side of the platform 10 and on the side of the process connection surface 16 are connected pressure-tightly with the platform 10 by means of peripheral weld seams 24, 26.

The two pressure input openings 12, 14 are sealed with respective first and second, isolating diaphragms 28, 30, wherein each isolating diaphragm is connected pressure-tightly with the process connection surface 16 of the platform 10 via a peripheral weld seam. First and second depressions 29, 31 covered by the isolating diaphragms 28, 30 have essentially flat bases. I.e., no specially formed diaphragm beds are provided, on which the isolating diaphragms are supported in the case of overload. Such measure can be omitted in this case, since the pressure difference sensor has an overload resistant, pressure difference measuring cell 40, whose strength is increased further by two ceramic stiffening elements 42, 44, for example, of silicon nitride or aluminum nitride, which are bonded to respective sides of the pressure difference measuring cell 40 by means of glass solder. The pressure difference measuring cell 40 is especially a micromechanical, pressure difference measuring cell 40 made of silicon and formed as a capacitive transducer. The pressure difference measuring cell 40 communicates via ducts, which extend through the stiffening elements 42, 44, with the two pressure tubes 20, 22, wherein the stiffening elements 42, 44 are pressure tightly and pressure bearingly adhered, soldered, or brazed to the rear faces of the pressure tubes 20, 22.

Extending from the rear side 18 of platform body 10 are additionally first and second filling ducts 32 34, which communicate with the respective depressions 29, 31 in the process connection surface. Via these fillings ducts, the volume portions of the hydraulic system of the pressure difference sensor in communication with them are filled with a pressure transfer liquid. Then, the filling ducts 32, 34 are pressure tightly sealed.

The pressure difference sensor is connected via its process connection surface to a process connection block 50 by means of bolts.

As above described, the platform can be a VA steel, the pressure tubes a Kovar alloy, the stiffening elements a ceramic material and the pressure difference sensor element a semiconductor material, for example, silicon.

Due to the different coefficients of thermal expansion of the individual materials, the thermomechanical behaviors of the individual parts differ. Especially, the platform of VA steel ($\alpha_P$ about 15-20 ppm/Kelvin) expands significantly more than the composite of pressure difference measuring cell of silicon ($\alpha_{DC}$ about 1-3 ppm/Kelvin) and the stiffening elements of ceramic ($\alpha_{SE}$ about 3-8 ppm/Kelvin). These expansion differences result in the case of a temperature change ΔT in a thermomechanical reaction of the platform on the composite and lead to the above mentioned disadvantages.

Figure 2:
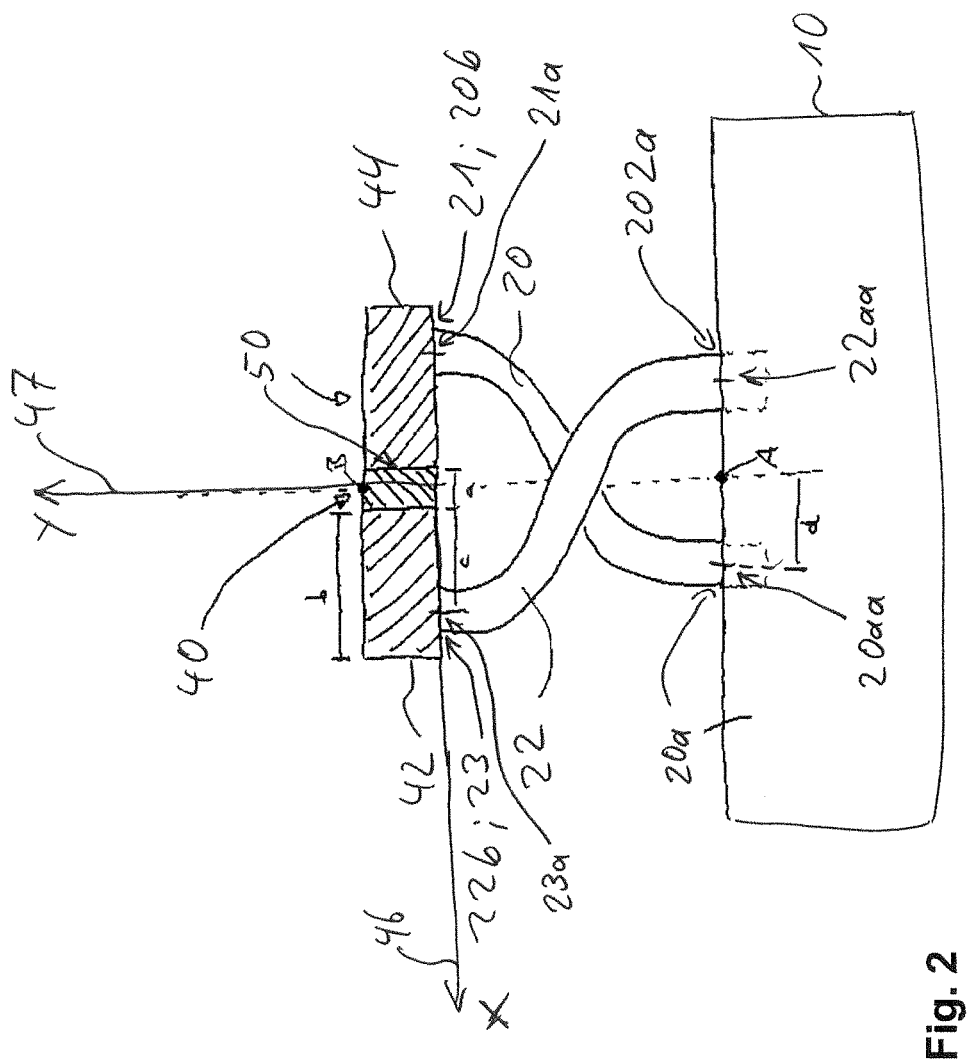
FIG. 2 is a schematic longitudinal section through a first example of an embodiment of a pressure difference sensor of the invention.

FIG. 2 shows a schematic longitudinal section through a first example of an embodiment of a pressure difference sensor of the invention, which has properties improved as regards thermomechanical reaction. To this end, the pressure difference sensor includes, instead of the straight pressure tubes illustrated in FIG. 1, pressure tubes, or capillary tubes, bent in a region between the second surface 18 of the platform and the rear faces of the pressure tubes 20, 22.

Figure 3:
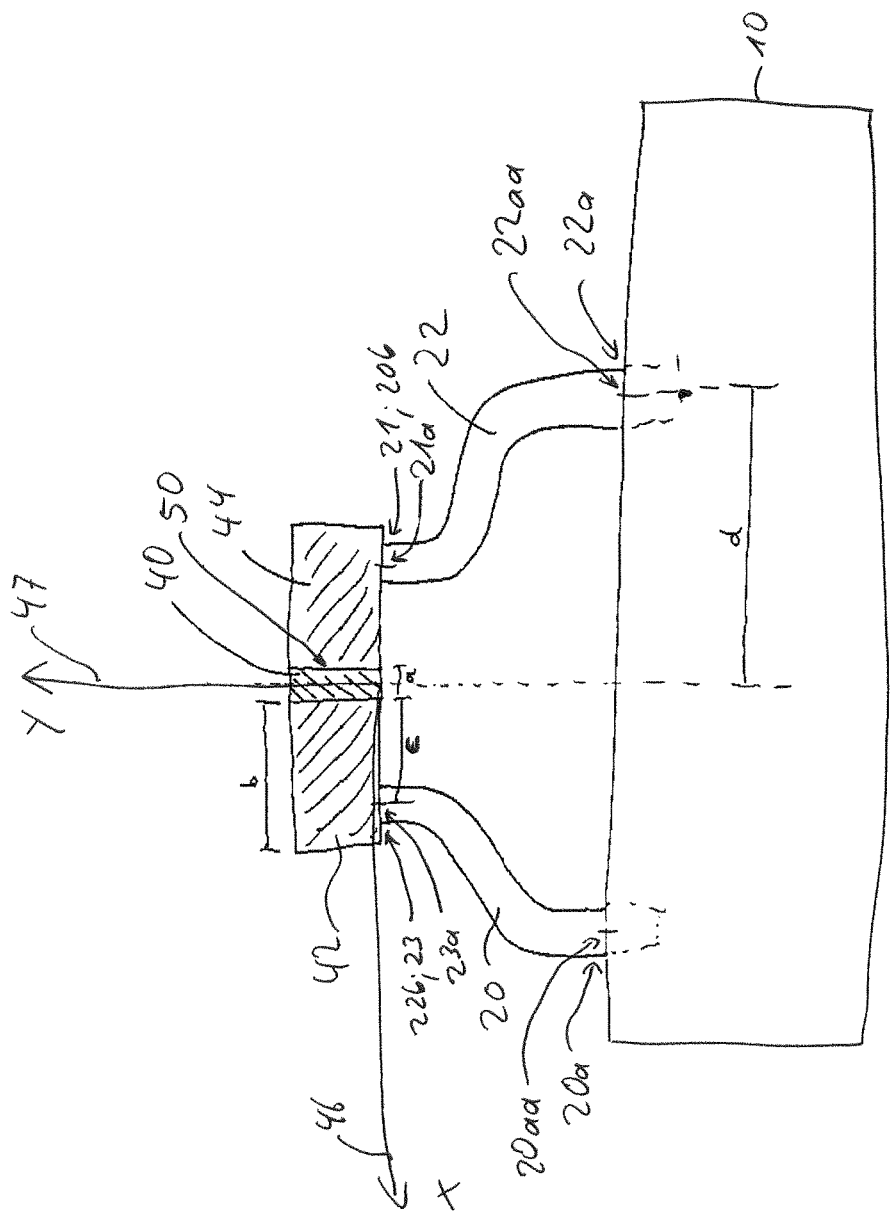
FIG. 3 is a schematic longitudinal section through a second example of an embodiment of a pressure difference sensor of the invention.

To provide a means of reference, a coordinate system with x-, y- and z-axes is shown in FIGS. 2 to 5. The coordinate system is oriented in such a manner that the second surface of the platform lies in an xy-plane defined by the x-axis and the y-axis, wherein the z-axis is orthogonal to the xy-plane. The y-axis represents, furthermore, a symmetry axis, or rotational axis, of the pressure difference sensor. Due to the essentially symmetric construction, considerations can be limited to a symmetry half. In FIGS. 2 and 3, the z-axis extends in such a manner that it is perpendicular to the plane of the view, while in FIGS. 4 and 5 the y-axis extends in such a manner that it is perpendicular to the plane of the view.

The invention is based on an underlying concept that, considering the different coefficients of thermal expansion of the individual materials, a thermomechanical reaction of the platform on the composite of stiffening element and pressure difference measuring cell can be minimized, when the sum of the thermal expansions of the individual parts along an axis is minimized. In the ideal case, a thermomechanical reaction can, in this way, essentially be completely suppressed, when the sum of the thermal expansions of the individual parts along an axis is essentially zero.

In the following, two cases are distinguished:
First Case: The capillary tubes bend toward the symmetry axis, i.e. the capillary tubes bend toward one another;
Second Case: The capillary tubes, as seen from the stiffening elements, bend away from the symmetry axis, i.e. the capillary tubes bend away from one another.

FIG. 2 shows an example of an embodiment according to the first case, in which the capillary tubes bend in such a manner that they bend toward one another.

Based on the underlying concept as applied to the first case illustrated in FIG. 2, the following equation results:

$$d \cdot \alpha_P \cdot \Delta T - \left(c + d + \frac{a}{2}\right) \cdot \alpha_{PT} \cdot \Delta T + c \cdot \alpha_{SE} \cdot \Delta T + \frac{a}{2} \cdot \alpha_{DC} \cdot \Delta T = 0$$

wherein the following definitions hold:
a: thickness of the pressure difference measuring cell 40 in the direction of a first axis 46, which is defined by a first midpoint 21a of the first connecting area 21 and a second midpoint 23a of the second connecting area 23;
c: separation in the direction of the first axis 46 between a second axis 47, which is a symmetry axis of the pressure difference sensor, and the first midpoint 21a;
d: separation in the direction of the first axis 46 between the second axis 47 and a midpoint 20aa of the first end of the pressure tube;
$\alpha_{DC}$: thermal expansion coefficient of the pressure difference measuring cell;
$\alpha_{SE}$: thermal expansion coefficient of the stiffening elements;
$\alpha_{PT}$: thermal expansion coefficient of the pressure tubes
$\alpha_P$: thermal expansion coefficient of the platform.

Starting from the above equation, there results, thus, a pressure difference sensor with minimum thermomechanical reactions, when the following equation is fulfilled:

$$d \cdot \alpha_P + c \cdot \alpha_{SE} + \frac{a}{2} \cdot \alpha_{DC} = \left(c + d + \frac{a}{2}\right) \cdot \alpha_{PT}$$

From this, the following design equation can be derived for the design of a first case pressure difference sensor with minimum thermomechanical reactions:

$$\left| \frac{d \cdot \alpha_G + c \cdot \alpha_{VK} + \frac{a}{2} \cdot \alpha_{DZ} - \left(c + d + \frac{a}{2}\right) \cdot \alpha_K}{d \cdot \alpha_G + c \cdot \alpha_{VK} + \frac{a}{2} \cdot \alpha_{DZ} + \left(c + d + \frac{a}{2}\right) \cdot \alpha_K} \right| \leq \beta,$$

wherein $\beta \leq 0.1$, preferably $\leq 0.05$, especially preferably $\leq 0.02$.

By means of the design equation, thus, based on already predetermined coefficients of thermal expansion, i.e. coefficients of thermal expansion established due to the choice of materials, a parameter set for the parameters a, c and d can be determined, which defines, or establishes, the bending of the capillary tubes.

Thus, by means of the above design equation for the first case, for example, a pressure difference sensor can be designed with the following parameters: a=1 mm; c=3 mm and d=2.21 mm, wherein the following coefficients of thermal expansion were assumed: $\alpha_{DC}$=2 ppm/K; $\alpha_{SE}$=5 ppm/K; $\alpha_{PT}$=9 ppm/K and $\alpha_P$=16 ppm/K.

FIG. 3 shows a schematic longitudinal section through a second example of an embodiment of a pressure difference sensor of the invention, in the case of which the capillary tubes, according to the above described second case, bend outwardly as seen from the stiffening elements.

Based on the same underlying concept as in the first case, the following equation results for the second case illustrated in FIG. 3:

$$d \cdot \alpha_P \cdot \Delta T - \left(d - c - \frac{a}{2}\right) \cdot \alpha_{PT} \cdot \Delta T - c \cdot \alpha_{SE} \cdot \Delta T - \frac{a}{2} \cdot \alpha_{DC} \cdot \Delta T = 0$$

wherein again the following definitions hold:
a: thickness of the pressure difference measuring cell 40 in the direction of a first axis 46, which is defined by a first midpoint 21$a$ of the first connecting area (21) and a second midpoint 23$a$ of the second connecting area 23;
c: separation in the direction of the first axis 46 between a second axis 47, which is a symmetry axis of the pressure difference sensor, and the first midpoint 21$a$;
d: separation in the direction of the first axis 46 between the second axis 47 and a midpoint 20$aa$ of the first end of the pressure tube;
$\alpha_{DC}$: thermal expansion coefficient of the pressure difference measuring cell;
$\alpha_{SE}$: thermal expansion coefficient of the stiffening elements;
$\alpha_{PT}$: thermal expansion coefficient of the pressure tubes
$\alpha_P$: thermal expansion coefficient of the platform.

Starting from the above equation, a pressure difference sensor with minimum thermomechanical reactions thus results, when the following equation is fulfilled:

$$d \cdot \alpha_P = \left(d - c - \frac{a}{2}\right) \cdot \alpha_{PT} + c \cdot \alpha_{SE} + \frac{a}{2} \cdot \alpha_{DC}$$

From this, the following design equation can be derived for the design of a pressure difference sensor with minimum thermomechanical reactions for the second case:

$$\left| \frac{\left(d - c - \frac{a}{2}\right) \cdot \alpha_{PT} + c \cdot \alpha_{SE} + \frac{a}{2} \cdot \alpha_{DC} - d \cdot \alpha_P}{\left(d - c - \frac{a}{2}\right) \cdot \alpha_{PT} + c \cdot \alpha_{SE} + \frac{a}{2} \cdot \alpha_{DC} + d \cdot \alpha_P} \right| \leq \beta,$$

wherein, again, $\beta \leq 0.1$, preferably $\leq 0.05$, especially preferably $\leq 0.02$.

Thus, by means of the above design equation for the second case, for example, a pressure difference sensor with the following parameters, a=0.8 mm; c=3 mm and d=6 mm, can be designed, wherein the following coefficients of thermal expansion were assumed: $\alpha_{DC}=2$ ppm/K; $\alpha_{SE}=5$ ppm/K; $\alpha_{PT}=9$ ppm/K and $\alpha_P=16$ ppm/K.

In the above described cases illustrated in FIGS. 2 and 3, it has been assumed that all materials have isotropic coefficients of thermal expansion.

In principle, however, also the case can occur that the materials do not have isotropic coefficients of expansion, so that in the above equations the thermal expansion in the direction of the y-axis or z-axis or, in given cases, an angle dependent, linear combination thereof must be given.

Furthermore, it has been assumed in the above examples that the capillary tubes 20, 22 have a bend in only one plane for minimizing the thermomechanical reactions of the platform 10 on the composite of stiffening elements 42, 44 and pressure difference measuring cell 10 along the x-axis. Actually, thermomechanical reactions also naturally occur along the other axes; in the example of an embodiment illustrated in FIG. 2, for example, along the z-axis. This then leads to the fact that the capillary tubes 20, 22 must have a 3D bend, i.e. a bend in two planes, for minimizing the thermomechanical reactions. Such 3D-bent capillary tubes are, however, more complex to manufacture, than capillary tubes with a 2D-bend, i.e. capillary tubes, which are only bent in one plane, so that one would rather avoid 3D-bent capillary tubes.

In the following, a further idea of the invention is explained, with which it is possible to avoid complex manufacture of 3D-bent capillary tubes 20, 22. By way of example for this, FIG. 4 shows a schematic plan view of the pressure difference sensor illustrated in FIG. 2.

Figure 4:
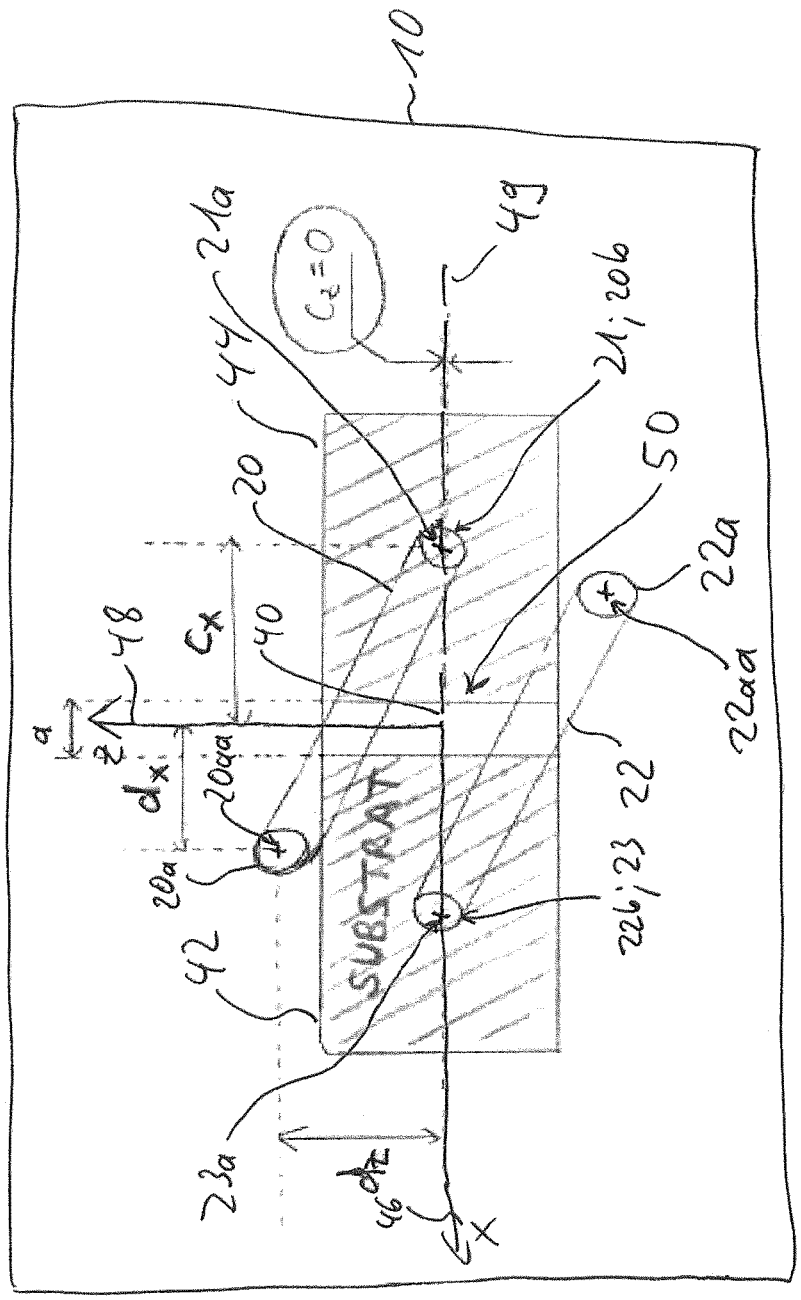
FIG. 4 is a schematic plan view of the first example of an embodiment of the pressure difference sensor of the invention.

Evident from FIG. 4 is that the two connecting areas 21, 23 are arranged between the respective second ends 20$b$, 22$b$ of the capillary tubes 20, 22 and the respective stiffening elements 42, 44 symmetrically to a yz-plane and lie with their midpoints 21$a$, 23$a$ on the x-axis, so that the separation between the x-axis and the midpoints 21$a$, 23$a$ of the second end of the capillary tube along the z-axis is zero ($c_z=0$).

If one applies the underlying concept of the invention also on the z-axis for the plan view illustrated in FIG. 4, the following equation results:

$$d_z \cdot \alpha_P = d_z \cdot \alpha_{PT}$$

wherein the following definitions hold:
$d_z$: separation between the plane 49 and the midpoint of the respective pressure tube at the first end 20$aa$, 22$aa$;
$\alpha_{PT}$: thermal expansion coefficient of the pressure tubes
$\alpha_P$: thermal expansion coefficient of the platform.

From this it follows that that the equation is only fulfillable, when $\alpha_P=\alpha_{PT}$, i.e. the materials for the platform and the capillary tubes are so selected that they have essentially the same thermal expansion coefficient.

In the case, in which the materials of the platform 10 and the capillary tubes 20, 22 have different coefficients of thermal expansion, the thermomechanical reaction along the z-axis can, in spite of this, still be minimized without a 3D-bending of the capillary tubes 20, 22. For this, according to the invention, the connecting areas 21, 23 between the second end 20$b$, 22$b$ of the respective capillary tube 20, 22 and the respective stiffening element 40, 44 are offset by a predetermined value $c_z$ from the x-plane 49 antisymmetrically to the symmetry axis.

Figure 5:
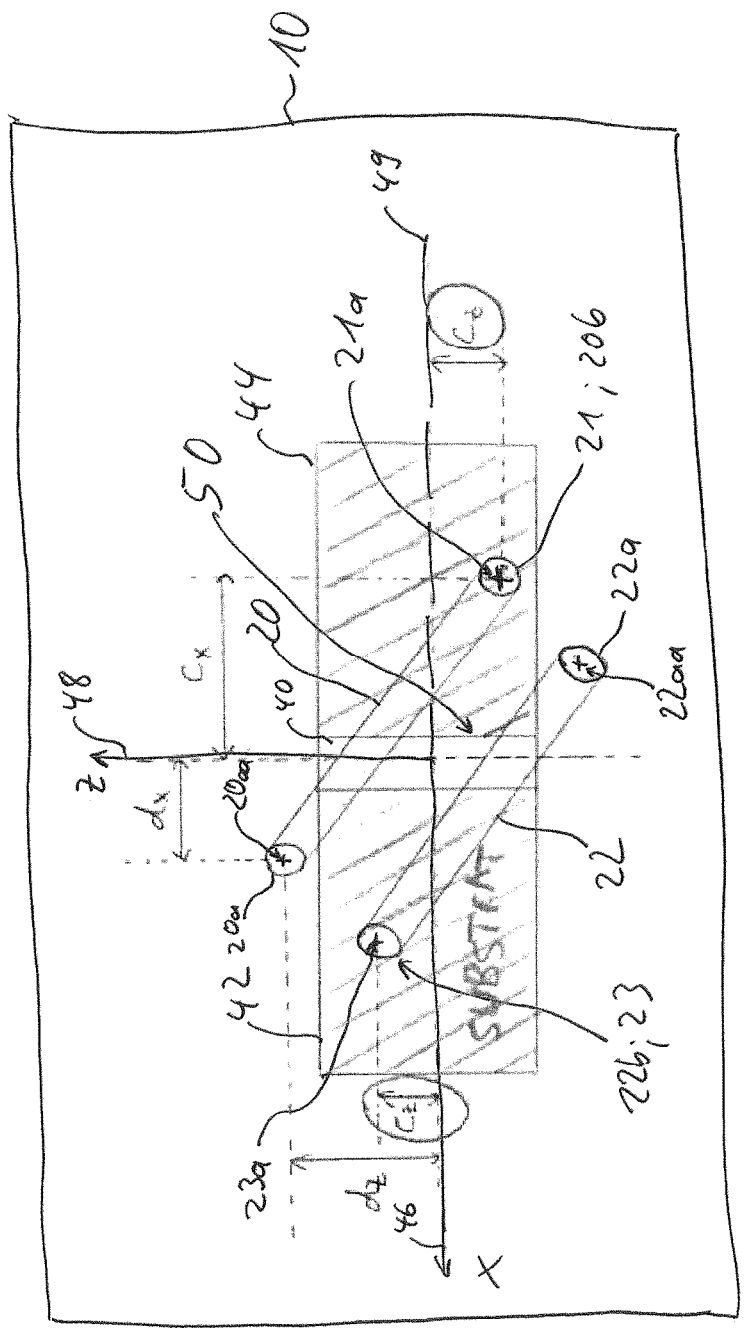
FIG. 5 is a schematic plan view of a third example of an embodiment of a pressure difference sensor of the invention.

FIG. 5 shows a schematic plan view of a third example of an embodiment of a pressure difference sensor of the invention, in the case of which the two connecting areas 21, 23 are offset by the value $c_z$, so that the following equation results for thermal stress equilibrium in the z-direction:

$$c_z \cdot \alpha_{SE} + d_z \cdot \alpha_P = (c_z + d_z) \cdot \alpha_{PT}$$

wherein the following definitions hold:
$c_z$: separation in the direction of a third axis 48 between the plane 49 and the first and second midpoints 21$a$, 23$a$ of the first and second connecting areas 21, 23, wherein the third axis is orthogonal to the first and second axes;
$d_z$: separation between the plane 49 and the midpoint of the pressure tubes at the respective first ends 20$aa$, 22$aa$;
$\alpha_{SE}$: thermal expansion coefficient of the stiffening elements;
$\alpha_{PT}$: thermal expansion coefficient of the pressure tubes;
$\alpha_P$: thermal expansion coefficient of the platform.

From this, the following design equation can be derived for the design of a pressure difference sensor with minimum thermomechanical reactions according to the third example of an embodiment:

$$\frac{|c_Z| \cdot \alpha_{SE} + |d_Z| \cdot \alpha_P - (|c_Z| + |d_Z|) \cdot \alpha_{PT}}{|c_Z| \cdot \alpha_{SE} + |d_Z| \cdot \alpha_P + (|c_Z| + |d_Z|) \cdot \alpha_{PT}} \leq \beta$$

wherein $\beta \leq 0.1$, preferably $\leq 0.05$, especially preferably $\leq 0.02$.

In turn, a solution for $c_Z$ and $d_Z$ can, in general, be found for this design equation in the case of fixed coefficients of thermal expansion $\alpha_{PT}$ and $\alpha_P$.

Thus, for example, a pressure difference sensor with the following parameters: $c_Z=2$ mm; $d_Z=1.14$ mm can be designed for the following coefficients of thermal expansion: $\alpha_{DC}=2$ ppm/K; $\alpha_{SE}=5$ ppm/K; $\alpha_{PT}=9$ ppm/K, $\alpha_P=16$ ppm/K and $\beta=0$.

For the example of an embodiment shown in FIG. 5, the design equation for the above mentioned cases along the x-axis also holds, so that the bending is fixed by the parameter set, $a_x$, $b_x$, $c_x$, $d_x$, $c_z$ and $d_z$.

The invention claimed is:

1. A pressure difference sensor for providing a pressure measurement signal, comprising:
    a pressure difference measuring cell, which is suppliable with first and second pressures and which has a transducer, which outputs the pressure measurement signal as a function of a difference between the first and second pressures;
    a first ceramic stiffening element, which is joined with said pressure difference measuring cell and which has a first duct, via which the first pressure is suppliable to said pressure difference measuring cell;
    a second ceramic stiffening element, which is joined with said pressure difference measuring cell and which has a second duct, via which the second pressure is suppliable to said pressure difference measuring cell;
    a platform with first and second pressure input openings, each of which extends from a first surface to a second surface of said platform, wherein said pressure input openings are sealed on the first surface, each with its own isolating diaphragm;
    a first pressure tube, which with a first end communicates with said first pressure input opening and which is pressure tightly connected with said platform, wherein said first pressure tube with a second end is pressure tightly connected with said first stiffening element at a first connecting area; and
    a second pressure tube, which with a first end communicates with said second pressure input opening and which is pressure tightly connected with said platform, wherein said second pressure tube with a second end is pressure tightly connected with said second stiffening element at a second connecting area, wherein:
    said first pressure tube has at least one bend in a region between the second surface of said platform and the first connecting area of the corresponding pressure tube; and
    said second pressure tube has at least one bend in a region between the second surface of said platform and the second connecting area of the corresponding pressure tube.

2. The pressure difference sensor as claimed in claim 1, wherein:
    said at least one bend in said pressure tubes is embodied in such a manner that a thermomechanical reaction of said platform on a composite of said stiffening elements and said pressure difference measuring cell is minimized at thermal equilibrium.

3. The pressure difference sensor as claimed in claim 1, wherein:
    said at least one bend of a pressure tube is embodied in such a manner that said first and second pressure tubes are directed toward one another, preferably cross over one another, and essentially the following holds:

$$\left| \frac{d \cdot \alpha_P + c \cdot \alpha_{SE} + \frac{a}{2} \cdot \alpha_{DC} - \left(c + d + \frac{a}{2}\right) \cdot \alpha_{PT}}{d \cdot \alpha_P + c \cdot \alpha_{SE} + \frac{a}{2} \cdot \alpha_{DC} + \left(c + d + \frac{a}{2}\right) \cdot \alpha_{PT}} \right| \leq \beta$$

wherein the following definitions hold:
    a: thickness of said pressure difference measuring cell in the direction of a first axis, which is defined by a first midpoint of said first connecting area and a second midpoint of said second connecting area;
    c: separation in the direction of said first axis between a second axis, which represents a symmetry axis of the pressure difference sensor, and said first midpoint;
    d: separation in the direction of said first axis between said second axis and a midpoint of the first end of the pressure tube;
    $\alpha_{DC}$: thermal expansion coefficient of said pressure difference measuring cell;
    $\alpha_{SE}$: thermal expansion coefficient of said stiffening elements;
    $\alpha_{PT}$: thermal expansion coefficient of the pressure tubes;
    $\alpha_P$: thermal expansion coefficient of said platform; and
    $\beta \leq 0.1$, preferably $\leq 0.05$, especially preferably $\leq 0.02$.

4. The pressure difference sensor as claimed in claim 1, wherein:
    said at least one bend of a pressure tube is embodied in such a manner that said first and second pressure tubes are directed away from one another and essentially the following holds:

$$\left| \frac{\left(d - c - \frac{a}{2}\right) \cdot \alpha_{PT} + c \cdot \alpha_{SE} + \frac{a}{2} \cdot \alpha_{DC} - d \cdot \alpha_P}{\left(d - c - \frac{a}{2}\right) \cdot \alpha_{PT} + c \cdot \alpha_{SE} + \frac{a}{2} \cdot \alpha_{DC} + d \cdot \alpha_P} \right| \leq \beta$$

wherein the following definitions hold:
    a: thickness of said pressure difference measuring cell in the direction of a first axis, which is defined by a first midpoint of said first connecting area and a second midpoint of said second connecting area;
    c: separation in the direction of said first axis between a second axis, which represents a symmetry axis of the pressure difference sensor, and said first midpoint;
    d: separation in the direction of said first axis between said second axis and a midpoint of the first end of the pressure tube;
    $\alpha_{DC}$: thermal expansion coefficient of said pressure difference measuring cell;
    $\alpha_{SE}$: thermal expansion coefficient of said stiffening elements;
    $\alpha_{PT}$: thermal expansion coefficient of the pressure tubes;
    $\alpha_P$: thermal expansion coefficient of said platform; and
    $\beta \leq 0.1$, preferably $\leq 0.05$, especially preferably $\leq 0.02$.

5. The pressure difference sensor as claimed in claim 3, wherein:
    said first midpoint of said first connecting area and the second midpoint of said second connecting area are, in each case, offset by a predetermined value $c_Z$ from a plane, which is orthogonal to a joint plane, on which said particular stiffening element is joined with said pressure difference measuring cell, and offset rotationally symmetrically to the second axis.

6. The pressure difference sensor as claimed in claim 5, wherein: the following holds:

$$\frac{|c_Z| \cdot \alpha_{SE} + |d_Z| \cdot \alpha_P - (|c_Z| + |d_Z|) \cdot \alpha_{PT}}{|c_Z| \cdot \alpha_{SE} + |d_Z| \cdot \alpha_P + (|c_Z| + |d_Z|) \cdot \alpha_{PT}} \leq \beta$$

wherein the following definitions hold:
$c_Z$: separation in the direction of a third axis between said plane and the first, respectively the second, midpoint of the first, respectively second, connecting area, wherein the third axis is orthogonal to the first and second axes;
$d_Z$: separation between the plane and the midpoint of the respective pressure tube at the first end;
$\alpha_{SE}$: thermal expansion coefficient of said stiffening elements;
$\alpha_{PT}$: thermal expansion coefficient of said pressure tubes;
$\alpha_P$: thermal expansion coefficient of said platform; and
$\beta \leq 0.1$, preferably $\leq 0.05$, especially preferably $\leq 0.02$.

* * * * *